United States Patent
Mark et al.

(10) Patent No.: US 7,218,933 B2
(45) Date of Patent: May 15, 2007

(54) CELLULAR NETWORK HANDOFF DECISION MECHANISM

(75) Inventors: Brian Mark, Fairfax, VA (US); Alexe E. Leu, Arlington, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 0 days.

(21) Appl. No.: 11/075,983

(22) Filed: Mar. 10, 2005

(65) Prior Publication Data

US 2005/0181795 A1    Aug. 18, 2005

Related U.S. Application Data

(63) Continuation of application No. PCT/US03/28353, filed on Sep. 11, 2003.

(60) Provisional application No. 60/413,448, filed on Sep. 26, 2002, provisional application No. 60/409,574, filed on Sep. 11, 2002.

(51) Int. Cl.
 *H04Q 7/20* (2006.01)
(52) U.S. Cl. ............... 455/437; 455/439; 455/438; 455/436; 370/331; 370/332
(58) Field of Classification Search .......... 455/437, 455/439, 438, 436; 370/331, 332

See application file for complete search history.

(56) References Cited

U.S. PATENT DOCUMENTS

| | | | | |
|---|---|---|---|---|
| 5,940,452 A * | 8/1999 | Rich | .............. | 375/347 |
| 5,999,816 A * | 12/1999 | Tiedemann et al. | .......... | 455/437 |
| 6,144,856 A * | 11/2000 | Ko | .............. | 455/436 |
| 6,240,291 B1 * | 5/2001 | Narasimhan et al. | ....... | 455/436 |
| 6,507,603 B1 * | 1/2003 | Haga et al. | .............. | 375/147 |
| 6,810,254 B2 * | 10/2004 | Tiedemann et al. | .......... | 455/437 |
| 7,006,841 B2 * | 2/2006 | Monogioudis et al. | ....... | 455/522 |
| 7,009,953 B2 * | 3/2006 | Tiedemann, Jr. | .......... | 370/332 |

\* cited by examiner

*Primary Examiner*—Danh Cong Le
(74) *Attorney, Agent, or Firm*—David G. Grossman; David Yee (57) ABSTRACT

Disclosed is a cellular network handoff decision mechanism which comprising the steps of: determining a sampling interval using a carrier wavelength; determining a local averaging interval that is larger than the sampling interval; determining a handoff decision interval that is larger than the local averaging interval; selecting at least two base stations from a multitude of base stations having a pilot signal from a reference cellular network using a selection criterion; determining a received signal strength from the pilot signal strength for each of the selected base stations once during every sampling interval; calculating a local average signal strength value using each of the received signal strengths once during every local averaging interval; determining an assignment region in which the local average signal strength value lies using a hysteresis range; and calculating a handoff decision once during every handoff decision interval using a handoff calculation.

36 Claims, 11 Drawing Sheets

CELLULAR NETWORK HANDOFF DECISION MECHANISM

CROSS-REFERENCE TO RELATED APPLICATIONS

This application is a continuation of Application No. PCT/US2003/028353, filed Sep. 11, 2003, which claims the benefit of U.S. provisional patent applications: Ser. No. 60/409,574 to Mark et al., filed on Sep. 11, 2002, entitled "Modeling and Analysis of Fast Handoff Algorithms for Microcellular Networks," and Ser. No. 60/413,448 to Mark et al., filed on Sep. 26, 2002, entitled "Timer-based Handoffs for Cellular Networks," which are hereby incorporated by reference.

STATEMENT REGARDING FEDERALLY SPONSORED RESEARCH OR DEVELOPMENT

The U.S Government has a paid-up license in this invention and the right in limited circumstances to require the patent owner to license others on reasonable terms as provided for by the terms of Grant No. ACI0133390 awarded by the National Science Foundation.

BACKGROUND OF THE INVENTION

The present invention relates to the field of cellular network systems. In particular, the present invention provides for efficient cellular handoffs in cellular networks.

In cellular networks each mobile unit maintains connectivity via an active set of base stations (BS). A handoff mechanism may determine the dynamics of the active set as the mobile unit moves through the network. In a hard handoff, the mobile unit is "handed off" from one BS to another BS as it leaves the cell coverage area of the first BS and enters that of the second BS. In this case, the active set of a mobile unit consists of at most one BS at any given time. Hard handoff mechanisms are used in the GSM and GPRS wireless networking standards and are still under active investigation for use in High Data Rate (HDR) services. Wireless technologies based on CDMA generally employ soft handoff, whereby the mobile unit maintains an active set that may contain multiple BSs. A soft handoff occurs whenever a BS enters or leaves the active set of a mobile unit. Soft handoff mechanisms are used in the IS-95, cdma2000, and WCDMA standards.

Figure 1:
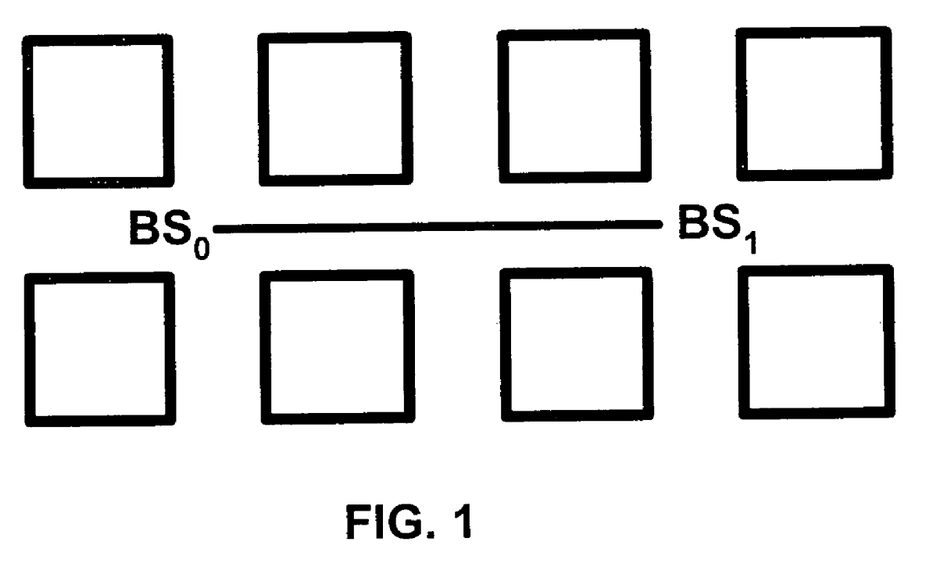
FIG. 1 shows a block diagram of a route for a line of sight (LOS) handoff.
Figure 2:
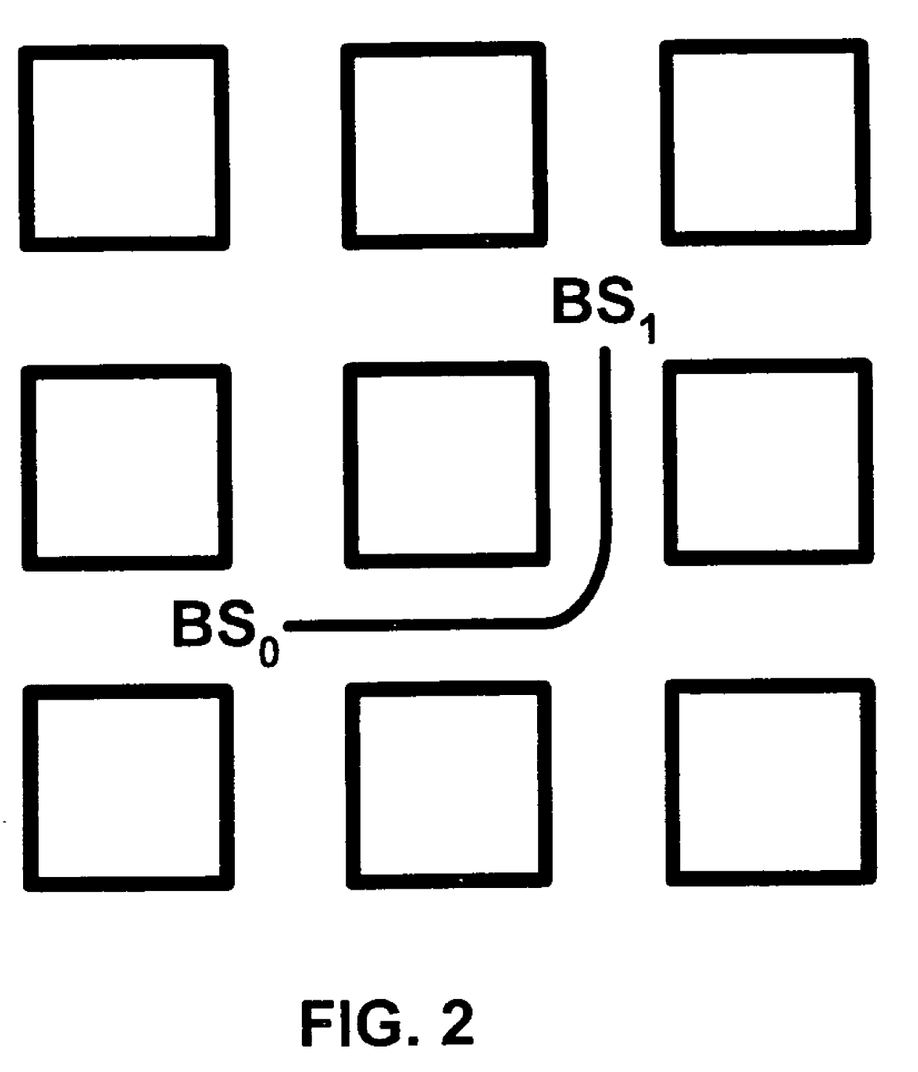
FIG. 2 shows a block diagram of a route for a non-line of sight (NLOS) handoff.

To manage the expected increase in subscriber density in future telephone systems, microcells may be used. The introduction of microcells causes some difficulties. The radio propagation characteristics for microcells differ from the macrocellular characteristics because of houses, buildings, and other obstacles disturbing the radio path. For line-of-sight (LOS) handoffs, the mobile always maintains a LOS with both the serving and alternate base stations as shown in FIG. 1. On the other hand, NLOS handoffs arise when the mobile suddenly loses the LOS with both the serving and alternate base station and gains an LOS component from a third base station. As shown in FIG. 2, a NLOS handoff can be due to a so-called corner effect, i.e., there is a 20–30 dB drop of signal level within a 10 m distance while the mobile turns corners in an urban microcellular environment.

Temporal-based handoff mechanisms may yield poor handoff performance in microcells due to the diverse propagation environment and the wide range of user velocities. Consider the NLOS handoff scenario shown in FIG. 2, where a mobile traveling from $BS_0$ has a Rician faded, log-normal shadowed LOS signal from $BS_0$ and a Rayleigh faded, log-normal shadowed, NLOS signal from $BS_1$ until it rounds the corner where the situation is suddenly reversed. The loss of the LOS component may cause a rapid decrease in the signal strength. Handoff mechanisms for this scenario should use shorter temporal averaging windows and larger hysteresis levels so that rapid changes in the mean signal strength can be detected and unnecessary handoffs avoided. Unfortunately, temporal averaging with a short fixed window length gives optimal handoff performance for only a single velocity.

Early work on handoff analysis has largely been based on computer simulation studies. Indeed, in industrial practice, computer simulation remains the primary means for choosing key parameters to optimize the performance of modern-day wireless networks. Detailed computer simulations of wireless cellular networks require considerable computation time, making them cumbersome to use for the purposes of network design and dimensioning.

Vijayan and Holtzman were among the first to propose an analytical model for handoff based on relative signal strength measurements with hysteresis. (See A Model for Analyzing Handoff Algorithms, IEEE Trans. on Vehicular Technology, 42(3):351–356, August 1993). Their model was based on an asymptotic approximation that is inaccurate for smaller hysteresis levels. Subsequently, Zhang and Holtzman proposed an alternative approximate method to analyze handoff based on the Gaussian properties of the received signals. (See Analysis of Handoff algorithms using both absolute and relative measurements. IEEE Trans. on Vehicular Technology, 45(1):174–179, February 1996).

A numerical procedure for analyzing signal strength-based handoff algorithms that computed handoff performance measures of interest was disclosed by Leu and Mark. (See Discrete-time Analysis of Soft Handoff in CDMA Cellular Networks, In Proc. Int. Conf. Comm. '2002, pages 3222–3226, New York City, April/May 2002). This procedure was very efficient for small hysteresis levels, but the computational complexity grew polynomially in the averaging parameter and the hysteresis value.

None of the works mentioned above deal with the corner effects that arise in microcellular urban environments. This effect has been verified by measurements and is characterized by a 20–30 dB drop of signal level in 10–20 meters and appears when a mobile unit turns around a corner and loses the LOS-path to the BS. This important phenomenon must be considered when handoff mechanisms and strategies are discussed.

What is needed is a cellular network handoff decision mechanism that reacts quickly to corner effects in microcellular urban environments and is efficient over a wide range of hysteresis values, avoiding a need for computer simulation of the system.

BRIEF SUMMARY OF THE INVENTION

One advantage of the present invention is that it introduces local averaging to reduce fast fading fluctuations without affecting path loss and slow fading characteristics, allowing a handoff mechanism to react more quickly to corner effects.

Another advantage of this invention is that it provides for efficient performance analysis of handoffs with local averaging.

A further advantage of this invention is that it may be used for the optimization and dimensioning of fast handoff mechanisms for microcellular urban environments.

Yet a further advantage of this invention is that it is efficient over a wide range of hysteresis values and may avoid the need for computer simulations of a system.

To achieve the foregoing and other advantages, in accordance with all of the invention as embodied and broadly described herein, is a cellular network handoff decision mechanism including: a reference cellular network having: at least two base stations, each base stations having: a location described by a position vector; and a pilot signal having a pilot signal strength; at least one mobile unit capable of: moving along a trajectory; and determining a received signal strength from the pilot signal; and a handoff decision mechanism including: a sampling interval, selected using a carrier wavelength; a local averaging interval, larger than the sampling interval; a handoff decision interval that is larger than the local averaging interval; a base station sampler capable of sampling the pilot signal strength from at least two of the base stations once during every sampling interval; a base station selector capable of selecting at least two of the base stations using a selection criterion which considers sampled pilot signal strengths; a local averager capable of calculating a local average signal strength value using the received signal strength from each of the selected base stations once during every local averaging interval using a local averaging calculation; a handoff signal classifier capable of determining an assignment region in which the local average signal strength value lies using a hysteresis range; and a handoff calculator, capable of calculating a handoff decision once during every handoff decision interval using a handoff calculation.

In yet a further aspect of the invention, the cellular network handoff decision mechanism further includes a drop timer.

In yet a further aspect of the invention, a method for making a cellular network handoff decision comprising the steps of: determining a sampling interval using a carrier wavelength; determining a local averaging interval that is larger than the sampling interval; determining a handoff decision interval that is larger than the local averaging interval; selecting at least two base stations from a multitude of base stations from a reference cellular network using a selection criterion, each of the base stations having: a location described by a position vector; and a pilot signal having a pilot signal strength; determining a received signal strength from the pilot signal strength for each of the selected base stations once during every sampling interval; calculating a local average signal strength value using each of the received signal strengths once during every local averaging interval; determining an assignment region in which the local average signal strength value lies using a hysteresis range; and calculating a handoff decision once during every handoff decision interval using a handoff calculation.

In yet a further aspect of the invention, a method for making a cellular network handoff decision wherein the handoff calculation considers a drop timer interval.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention is a cellular network handoff decision mechanism that reacts quickly to corner effects in microcellular urban environments and may be efficient over a wide range of hysteresis values. This invention introduces local averaging to remove fast fading fluctuations without affecting path loss and slow fading characteristics. Further, an embodiment of the present invention may be used to analyze the performance of handoff with local averaging, thus avoiding a need for computer simulation of the cellular system. Another embodiment of the present invention may be used as a tool for the optimization and dimensioning of fast handoff mechanisms in microcellular urban environments.

In urban microcellular environments, fast handoff mechanisms are needed to react to sudden changes in path loss characteristics that typically occur when a mobile cellular unit turns around street corners. The present invention is a cellular network handoff decision mechanism that uses a local averaging technique that may remove the fast fading component from a received signal strength. By exploiting the fact that local averaging does not substantially alter the path loss characteristics, the present invention is able to develop an efficient and accurate numerical procedure for analyzing the performance of this new mechanism. Numerical results demonstrate that the use of local averaging significantly reduces handoff delay in the presence of corner effects compared with conventional handoff mechanisms. Consequently, the outage probability may be reduced for an entire range of mobile speeds. Further, an embodiment of this invention may also be used as a tool for dimensioning fast handoff mechanisms that optimize network handoff performance for both line-of-sight (see FIG. 1) and non-line-of-sight (see FIG. 2) mobile cellular routes.

A basic description of a preferred embodiment of the invention will be described followed by a more detailed mathematically based description. These descriptions in combination teach those skilled in the art how to practice this invention.

Figure 3:
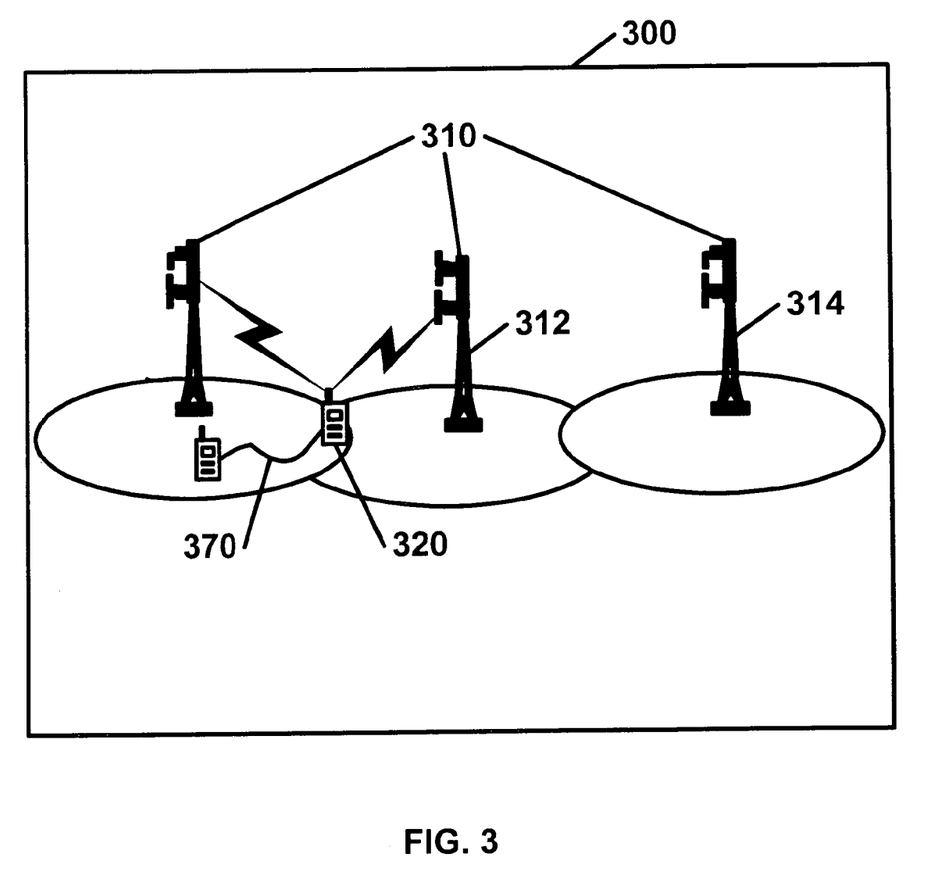
FIG. 3 shows a block diagram of a cellular network.
Figure 4:
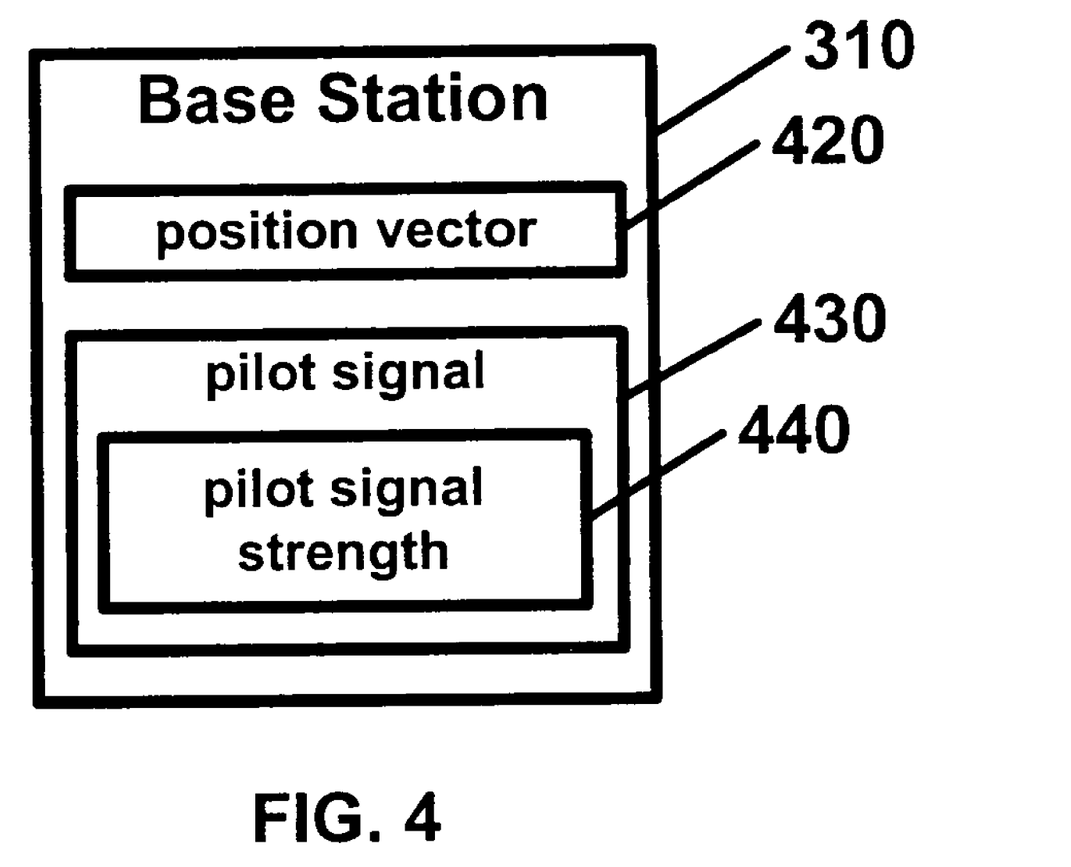
FIG. 4 shows a flow diagram of a base station as per an embodiment of the present invention.

The present invention is a cellular network handoff decision mechanism. This mechanism may be used in a reference cellular network 300 as shown in FIG. 3. The reference cellular system 300 may be an actual cellular network or a simulated cellular network. A reference cellular network 300 usually includes at least two base stations 310. Each of the base stations (shown in FIG. 4) has a location that may be described by a position vector 420. Each of the base stations 310 generally produces a pilot signal 430 having a pilot signal strength 440. One or more mobile units 320, such as cell phones, may move throughout the reference cellular network 300 along various trajectories 370. Preferably, each of these mobile unit(s) 320 will be capable of determining a received signal strength from several of the base station pilot signals 430.

Figure 6:
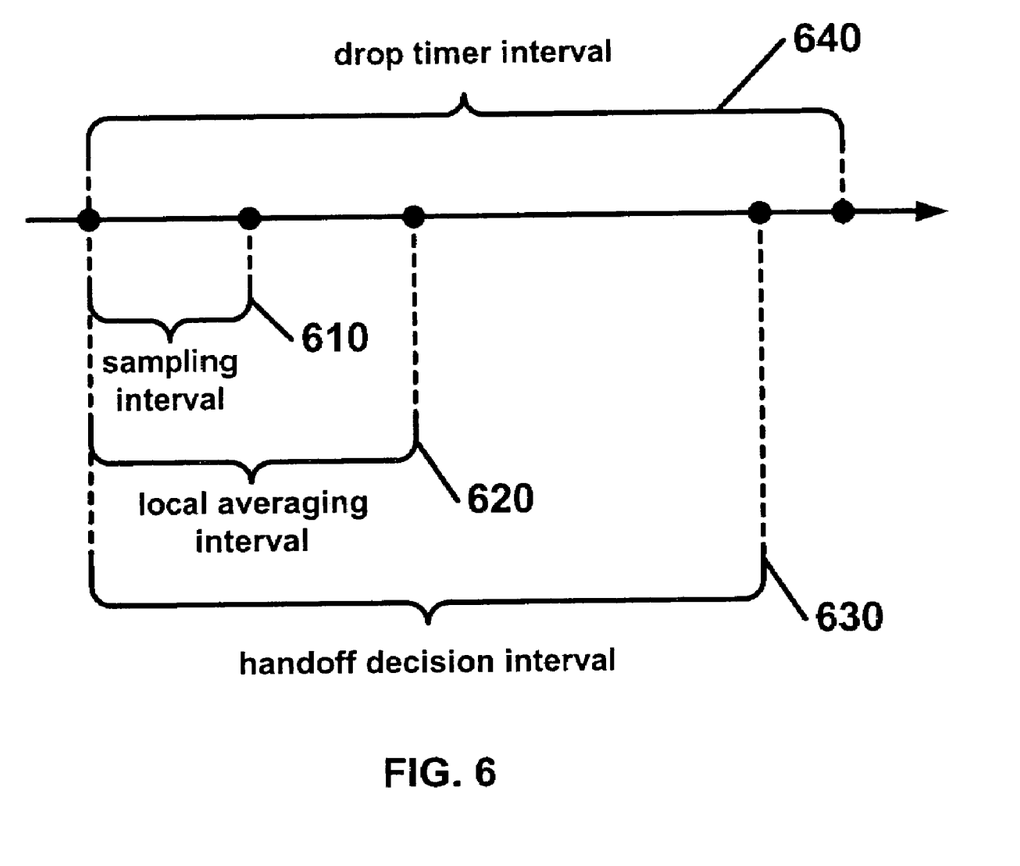
FIG. 6 shows a diagram of inter-related intervals as per an embodiment of the present invention.

Each of the mobile unit(s) 320, may then make a handoff decision 548 as it navigates the cellular network 300. This handoff decision 548 may be made using a handoff decision mechanism 540. The handoff decision mechanism 540 may use several intervals. These intervals are shown in FIG. 6 and may include a sampling interval 610, a local averaging interval 620, and a handoff decision interval 630. The selection of the sampling interval 610 may be determined using a carrier wavelength value. The local averaging interval 620 will generally be larger than said sampling interval 610, and the handoff decision interval 630 will generally be larger than the local averaging interval 620. In the currently preferred embodiment, these intervals are time intervals. However, one skilled in the art will recognize that other types of intervals may be used, such as frequency or distance intervals.

Figure 5:
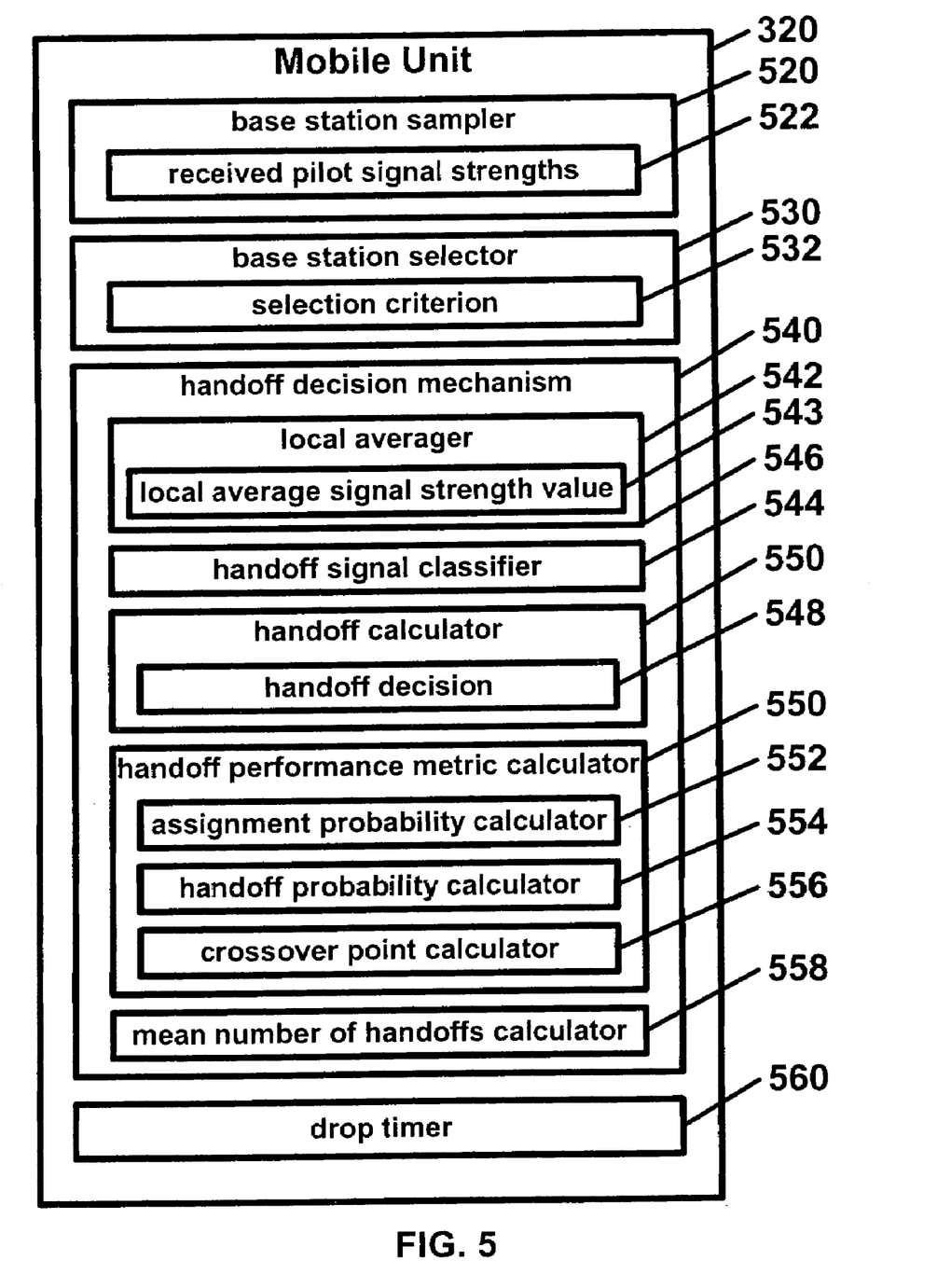
FIG. 5 shows a block diagram of a mobile unit as per an embodiment of the present invention.

Once during every sampling interval 610, a base station sampler 520 preferably determines a received pilot signal strength 522 from at least two of the base stations 310 by sampling the pilot signals 430 from these base stations 310. Next, a base station selector 530 may select at least two of the base stations 310 using a selection criterion 532. Although in some embodiments the base station selector 530 may only select two of the base stations 310, in other embodiments the base station selector 530 may select more of the base stations 310. This selection criterion 532 may be diverse. For example, the selection criterion 532 may consider the sampled pilot signal strengths 522. The selection criterion 532 may also prefer to select the currently selected base station.

A local averager 542 may then calculate a local average signal strength value 543 using the received signal strengths 522 from each of the selected base stations. This calculation usually occurs once during every local averaging interval 620 using a local averaging calculation.

A handoff signal classifier 544 may then determine an assignment region in which the local average signal strength value lies. This handoff signal classifier 544 will generally use a hysteresis range when making this determination.

Finally, a handoff calculator 546 may make a handoff decision 548 using a handoff calculation. Preferably, this handoff decision 548 is made once during every handoff decision interval 630. One skilled in the art will recognize that although the handoff decision 548 is made only one per handoff decision interval 630 in the currently preferred embodiment, the handoff calculation 548 may be made multiple times during this same interval 630, or even continuously during this same interval 630.

The cellular network handoff decision mechanism 540 may be a hard handoff decision mechanism or a soft handoff mechanism. In a hard handoff decision mechanism, a handoff decision 548 is generally made as between a first and second base station. In a soft handoff mechanism, a handoff decision 548 is generally made among a set of base stations.

The cellular network handoff decision mechanism 540 as per the present invention may further including a handoff performance metric calculator 550. Of course, it is envisioned that the handoff performance metric calculator 550 may be constructed to calculate any type of calculation metric that may be useful in evaluating performance. For example, this handoff performance metric calculator may includes different types of calculators such as an assignment probability calculator 552, a handoff probability calculator 554, a crossover point calculator 556, and/or outage probability calculator. The cellular network handoff decision mechanism 540 may also include a mean number of handoffs calculator 558.

Another embodiment of the present invention includes the use of a drop timer interval 640. The handoff performance metric calculator 550, assignment probability calculator 552, handoff probability calculator 554, crossover point calculator 556 and mean number of handoffs calculator 558 may use this drop timer interval 640 in their calculations.

The present invention may also be described as a series of steps. An example of such steps is presented for illustrative purposes in FIG. 7. A series of interrelated intervals may be determined at step S710 for use in making cellular network handoff decisions. A sampling interval 610, may be calculated in part using the wavelength of the base station/mobile unit carrier signal carrier. A second interval, the local averaging interval 620, may also be determined. The local averaging interval 620 should be larger than the sampling interval 610. Third, a handoff decision interval 630 which is larger than the local averaging interval 620 may also be established.

Figure 7:
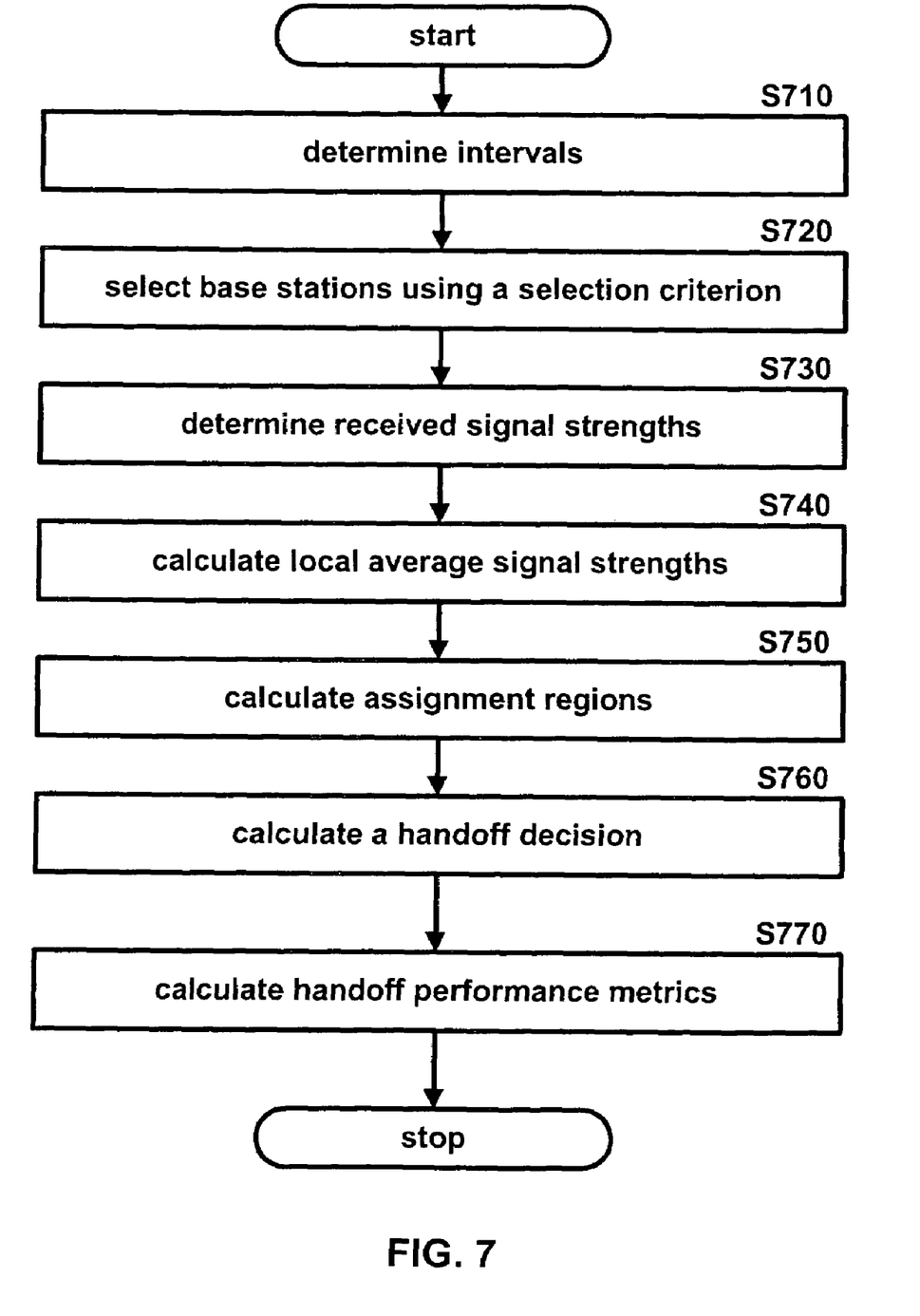
FIG. 7 shows a flow diagram as per an embodiment of the present invention.

The cellular network 300 preferably consists of a multitude of base stations 310. From these base stations 310, a mobile unit 320 should select at least two of the base stations 310 using a selection criterion at step S720. Each of the base stations 310 preferably have a position vector which describes their location within the cellular network 300. Further, each of the base stations 310 should have a pilot signal with a known pilot signal. The mobile unit 320 may then determine a received signal strength from the pilot signal for each of the selected base stations at step S730. This should occur once during every sampling interval 610. Next, once during every said local averaging interval 620, a local average signal strength value may be calculated using each of the received signal strengths at step S740. At step S750, after the local average signal strengths are determined, an assignment region in which the local average signal strength value lies using a hysteresis range may be calculated. Finally, at step S760, a handoff decision may be calculated once during each handoff decision interval 630 using a handoff calculation. This handoff calculation may further consider a drop timer.

Additionally, handoff performance metrics may be calculated at step S770. These additional step(s) may include calculating an assignment probability, a handoff probability, a crossover point, or a mean number of handoffs.

For illustrative purposes, a system model, as per the present invention, for analyzing the handoff performance of the mobile cellular networks in a large city environment will now be discussed. This illustrative cellular network consists of a set of base stations. The $i^{th}$ base station, $BS_i$, located by a position vector $b_i$, generally lies at the center of its associated cell i. The coverage area of cell i may be determined by the pilot signal strength from $BS_i$. The received signal strength from the $i^{th}$ base station may be given by:

$$Y_i(t) = m_i(t) + W_i(t) + Z_i(t) \quad (1)$$

where $m_i(t)$, $W_i(t)$, and $Z_i(t)$ represent, respectively, the path loss, lognormal shadow fading, and fast fading components.

For LOS propagation, a two-slope path loss model may be given by:

$$m_{LOS,i}(t) = v_i - u_i \log(\|r(t) - b_i\|) - \beta_i \log\left(1 + \frac{\|r(t) - b_i\|}{g}\right) \quad (2)$$

where $v_i$ is the base station transmit power, $u_i$ and $\beta_i$ control the path loss exponent and g is a breakpoint. Typical values for these variables may be: $u_i=2$, $\beta_i=1$ or 2, and 150 m $\leq g \leq$ 500 m.

For NLOS propagation, an experimentally validated model proposed by Grimlund and Gundmundson in an article entitled "Handoff strategies in microcellular systems," in Proc. IEEE VTC'91, pages 505–510 may be used. In this model, LOS propagation is assumed until the mobile rounds the corner of an obstacle, after which simulated LOS propagation may be assumed from an imaginary transmitter located at the corner having power equal to that received from the serving base station at the corner. More precisely, the path loss for NLOS propagation may be given by $$m_{NLOS,i}(t) = m_{NLOS,i}(t)u(-vt + D_c) + \quad (3)$$
$$m_{NLOS,i}(D_c/v) + m_{NLOS,i}(t - D_c/v)u(vt - D_c)$$

where $u(t)$ is the unit step function and $D_c$ is the distance from the base station to the corner of a street block, e.g., $D_c = 255$ m.

The shadow fading component $w_i(t)$ may be a Gaussian process with an exponentially decaying autocorrelation function:

$$R_{W_i}(\tau) = \sigma_{W_i}^2 \exp\left(-\frac{v\tau}{d_0}\right) \quad (4)$$

where $\sigma W_i$ is the standard deviation of the shadowing signal strength and the constant $d_0$ is a decay factor.

Exponential averaging as per the present invention will now be discussed. In conventional handoff algorithms, the received signal strength may be sampled at discrete time instants $t_k = k\tau_s$, where $\tau_s$ is the sampling interval. For convenience, assume that the mobile travels at a constant speed v. Then the corresponding sampling distance may be given by $d_s = v\tau_s$. An exponential averaging filter $f_{exp}(t)$ may be applied to the raw signal strength samples $Y_i(k\tau_s)$ to obtain the processed signal strength samples:

$$X_i[k] = Y_i(k\tau_s) * f_{exp}(k\tau_s) \quad (5)$$
where $$f_{exp}(t) = \frac{d_s}{d_{av}} \exp\left(\frac{-vt}{d_{av}}\right), k = 0, 1, \cdots \quad (6)$$

and * denotes discrete-time convolution. Handoff decisions may then be made based on the processed signal strength samples $X_i[k]$. The averaging filter, in effect, removes the fast fading component. However, the averaging filter may also introduce alterations to the shadowing and path loss components that could adversely affect handoff performance.

The discrete-time process $\{X_i[k]\}$ satisfies a second-order difference equation:

$$X_i[k] = (a+b)X_i[k-1] - \quad (7)$$
$$abX_i[k-2] + \frac{d_s}{d_{av}}(m_i[k] - am_i[k-1])\frac{d_s}{d_{av}}V_i[k]$$

for $k \geq 2$, where $\{V_i[k]\}$ is a zero mean, stationary white Gaussian noise process with variance $\sigma_{V_i}^2$. The parameters a and b may be given as follows:

$$a = \exp\left(-\frac{d_s}{d_0}\right), \quad b = \exp\left(-\frac{d_s}{d_{av}}\right).$$

From (7), it appears that $\{X_i[k]\}$ is a second-order autoregressive (AR) process. In particular, $\{X_i[k]\}$ may be characterized as a discrete-time second-order Markov chain on a continuous state space.

A local averaging technique as per an embodiment of the present invention will now be disclosed. For local averaging, the sampling time interval $\tilde{\tau}_s$ may be chosen to be smaller than the sampling interval $\tau_s$ used in conventional handoff algorithms. However, in the case of local averaging, the handoff decisions are preferably still made at intervals of $\tau_s$ as in conventional handoff algorithms. More precisely, the intervals $\tau_s$ and $\tilde{\tau}_s$ may be related by $\tau_s = M\tilde{\tau}_s$, where the choice of M will be discussed shortly. Correspondingly, the sampling distance intervals for measurement and handoff decisions preferably satisfy $d_s = M\tilde{d}_s$, where $d_s = v\tau_s$ and $\tilde{d}_s = v\tilde{\tau}_s$, with v denoting the speed of the mobile as before.

The purpose of local averaging is to effectively remove the fast fading component without significantly altering the statistical properties of the received signal strength. To perform local averaging, the following rectangular window function may be employed:

$$f_{la}(t) = \frac{d_s}{d_{av}}[u(vt) - u(vt - d_{av})]$$

where $u(t)$ is preferably a unit step function. The averaged signal strength may then be given by:

$$\overline{X}_i[k] = f_{la}(k\tilde{\tau}_s) * Y_i(k\tilde{\tau}_s),$$

where * denotes discrete-time convolution as before. Note, however, that the discrete-time signal $\overline{X}_i[k]$ is based on the sampling interval $\tilde{\tau}_s$ instead of $\tau_s$.

Considering an example carrier frequency $f_c$ of about 1.8 GHz, the autocorrelation function of the fast fading component $R_z(l)$ should be zero for $l=0.38\lambda_c$ and less than 0.3 for $l>0.38\lambda_c$, where $\lambda_c=c/f_c=0.166$ m. The averaging distance of $d_{av}=20\lambda_c$ to $40\lambda_c$ may be needed to sufficiently reduce the effects of fading when the sample spacing is less than $0.5\lambda_c$. Hence, assuming that $\tilde{Z}_i(t) \approx 0$, using local averaging, the handoff decisions may be made on the basis of the sub-sampled sequence $$\tilde{X}_i[k] = \overline{X}_i[kM] \quad (8)$$

which preferably corresponds to the sampling interval $\tau_s$. Recall that the handoff decisions for handoff algorithms using exponential averaging may be based on the discrete-time signal $X_i[k]$ as discussed earlier.

For local averaging, the sampling distance step $\tilde{d}_s$ is preferably chosen to eliminate fast fading at any value above $0.38\lambda_c=0.063$ m, where $\lambda_c$ is the carrier wavelength. The handoff decision step, $d_s$ may be determined based on slow fading autocovariance parameters. The filtered shadow fading component may be given by:

$$\overline{W}_i[k] = W_i(k\tilde{\tau}_s) * f_{la}(k\tilde{\tau}_s) \quad (9)$$

After subsampling, we may have:

$$\tilde{W}_i[k] = \overline{W}_i(kM) \quad (10)$$

The autocorrelation function of $\tilde{W}_i[k]$ may be given by:

$$R_{\tilde{W}}[n] = \alpha(N,\tilde{d}_s) R_W(n d_s) \quad (11)$$

when $nM \geq N-1$ and $$R_{\overline{W}}[n] = \frac{1}{N^2} \sum_{k=-N+1}^{N-1} (N-|k|) R_W(n d_s + k \tilde{d}_s) \quad (12)$$

when $nM<N-1$, where $N=\lceil d_{av}/\tilde{d}_s \rceil$ is the length of the averaging window and $$\alpha(N, \tilde{d}_s) \triangleq \frac{1}{N^2} \sum_{k=-N+1}^{N-1} (N-|k|) \exp\left(\frac{k\tilde{d}_s}{d_0}\right)$$

In particular, the GSM standard specifies a time decision interval for handoff of 480 ms. Therefore, when $\tau_s=0.5$ s, and mobile speed levels are higher then 4 m/s, the distance interval between consecutive handoff decisions may be $d_s \geq 2$ m. In the case of a carrier frequency $f_c=1.8$ GHz, the sampling interval for measurement acquisition of $\tilde{d}_s \approx 0.5\lambda_c$ m as discussed earlier, is 0.083 m. These assumptions may provide at least $M=24$ measurements within the handoff decision time interval. The fast fading is effectively removed for a number of samples $20 \leq N$, which is satisfied through our assumptions.

Therefore, the condition $nM \geq N-1$ in (12) may be entirely satisfied for speed values higher than 4 m/s. This shows that the local averaging technique effectively removes the fast fading without modifying the statistical properties of the shadow fading. Since the autocorrelation of the locally averaged shadowing may be given by $R_{\tilde{W}}[n]=\alpha(N,\tilde{d}_s)R_W(nd_s)$, $\tilde{W}_i[k]=\sqrt{\alpha(N,\tilde{d}_s)}W_i(K\tau_s)$ may be set for this discrete-time model. Here, the term $\sqrt{\alpha(N,\tilde{d}_s)}$ may be a scaling factor. Furthermore, the deterministic path loss component may not be modified significantly by local averaging.

Also note that when $\tilde{d}_s<<d_0$, $\alpha(N,\tilde{d}_s) \approx 1$. Accordingly, the following approximation may be used:

$$R_{\tilde{W}}[n] \approx R_W(nd_s), \text{ for } nM \geq N-1 \text{ and } \tilde{d}_s<<d_0 \quad (14)$$

Therefore, $\tilde{X}[k] \approx Y_i(k\tau_s)$. This has been verified by computer simulations of signal strength sample paths. This result allows the performance of handoff algorithms to be analyzed using local averaging in terms of samples $Y_i[k]=Y_i(k\tau_s)$ of the raw signal strength signal. Consequently, local averaging leads to a simpler mathematical characterization of handoff performance. In particular, the process $\{Y_i[k]\}$ is a first-order Markov chain that satisfies the following difference equation (cf. Eq. (7)):

$$Y_i[k] = aY_i[k-1] + m_i[k] - am_i[k-1] + V_i[k],$$

for $k \geq 1$ with the initialization condition $$Y_i[0] = m_i[0] - V_i[0].$$

An important class of handoff algorithms operates on the basis of relative processed signal strength between two candidate base stations $BS_i$ and $BS_j$. For handoff algorithms based on conventional exponential averaging, the relative signal strength may be given by $$X[k] = X_i[k] - X_j[k].$$

In the case of local averaging, the relative processed signal strength may be given by:

$$\tilde{X}[k] = \tilde{X}_i[k] - \tilde{X}_j[k].$$

A handoff of a mobile user from base station $BS_i$ to base station $BS_j$ may occur when the relative processed signal strength falls below the value $-h_j$. Conversely, a handoff from base station $BS_j$ to base station $BS_i$ may occur when $X(t)$ exceeds the value $h_i$. The values $h_i$ and $h_j$ are hysteresis levels associated with base stations $BS_i$ and $BS_j$, respectively.

We define three assignment regions, which are intervals of the real-line: $I=[h_i, \infty]$, $J=[-\infty, h_j]$, and $H=[-h_j, h_i]$. Handoff behavior may be characterized in terms of the regions to which the relative signal strength is assigned at each value of the discrete-time parameter k. For the conventional handoff example, the mobile may be assigned to base station k if $X[k] \in I$ or if $X[l] \in I$ for some $l<k$ and $X[j] \in H$ for $l<j \geq k$ (and similarly for handoff using local averaging).

Key performance parameters of interest include the assignment probabilities and the handoff probabilities. These are denoted by $P_i[k]$ and $P_j[k]$, the probability that the mobile is assigned to base station $BS_i$ and $BS_j$ at time k, respectively. Similarly, we may denote the handoff probability at time k from $BS_i$ to $BS_j$ and from $BS_j$ to $BS_i$ by $P_{ij}[k]$ and $P_{ji}[k]$, respectively.

We now discuss a recursive method to compute the assignment and handoff probabilities using exponential averaging. For convenience, we shall denote $X[k]$ by $X_k$. We define a sequence of bivariate functions $\{g_k(x_{k-1}, x_k), k \geq 1\}$ as follows:

$$g_1(x_0, x_1) = f_{0,1}(x_0, x_1)$$

$$g_2(x_1, x_2) = \int_I g_1(x_0, x_1) f_{2|0,1}(x_2|x_0, x_1) dx_0$$

-continued $$g_k(x_{k-1}, x_k) = \int_I f_{k-2,k-1}(x_{k-2}, x_{k-1}) \cdot f_{k|k-2,k-1}(x_k|x_{k-2}, x_{k-1})$$

$$dx_{k-2} + \int_H g_{k-1}(x_{k-2}, x_{k-1}) \cdot f_{k|k-2,k-1}(x_k|x_{k-2}, x_{k-1}) dx_{k-2}$$

for $k \geq 3$. Here, $f_{k-1,k}(x_{k-1}, x_k)$ is the joint density of $\{X[k-1], X[k]\}$ and $f_{k|k-2,k-1}(x_k|x_{k-2}, x_{k-1})$ is the conditional density of $X[k]$ given $X[k-1]$ and $X[k-2]$. With these definitions, the probability of cell assignment to $BS_i$ may be expressed as follows (the corresponding result for the probability of cell assignment to $BS_j$ being analogous):

$$P_i[k] = p_k + p_k(IH) + \int_H \int_H g_k(x_{k-1}, x_k) dx_k dx_{k-1}$$

for $k \geq 2$, with the initialization conditions:

$$P_i[1] = p_1(I) + p_1(IH),$$

$$P_i[0] = p_0(I).$$

The probability $P_k(I)$ may be given by $$P_k(I) = \int_I f_k(x_k) dx_k, k \geq 0,$$

while $p_k(IH)$ may be given by $$p_k(IH) = \int_I \int_H f_{k-1,k}(x_{k-1}, x_k) dx_k dx_{k-1}$$

for $k \geq 1$.

The handoff probability from $BS_i$ and $BS_j$, may be expressed similarly in terms of the functions $g_k$ (the corresponding result for the probability of handoff from $BS_j$ to $BS_i$ being analogous):

$$P_{ij}[k] = p_k(IJ) + \int_H \int_J g_k(x_{k-1}, x_k) dx_k dx_{k-1} \quad (15)$$

for $k \geq 2$, with $P_{ij}[1] = p_1(IJ)$. The probability $p_k(IJ)$ may be given by $$p_k(IJ) = \int_I \int_J f_{k-1,k}(x_{k-1}, x_k) dx_k dx_{k-1}$$

for $k \geq 1$.

The handoff performance under local averaging may be analyzed by considering the raw signal strength sequence $Y[k]$, which is a first-order Markov chain. A recursive procedure to analyze handoff using local averaging is now developed. The procedure is simpler than the one described above for conventional handoff with exponential averaging. Therefore, handoff algorithms with local averaging may be analyzed more efficiently than conventional handoff algorithms.

For convenience, $Y[k\tau_s]$ may be denoted by $Y[k]$. A sequence of functions $\{q_k(y), k \geq 1\}$ is defined as follows:

$$q_0(y_0) = f_{Y_0}(y_0)$$

$$q_1(y_1) = \int_I q_0(y_0) f_{Y_1|Y_0}(y_1|y_0) dy_0$$

$$q_k(y_k) = \int_I f_{Y_{k-1}}(y_{k-1}) f_{Y_k|Y_{k-1}}(y_k|y_{k-1}) dy_{k-1} +$$

$$\int_H q_{k-1}(y_{k-1}) f_{Y_k|Y_{k-1}}(y_k|y_{k-1}) dx_{k-1}$$

for $k \geq 1$. Here, $f_{Y_k}(y_k)$ is the density of $Y_k$ and $f_{Y_k|Y_{k-1}}(y_k|y_{k-1})$ is the conditional density of $Y_k$ given $Y_{k-1}$. With these definitions, the probability of cell assignment to $BS_i$ may be expressed as follows (the corresponding result for the probability of cell assignment to $BS_j$ being analogous):

$$P_k[I] = p_k(I) + \int_H q_k(y_k) dy_k, k \geq 1,$$

$$P_k[0] = p_0(I)$$

The probabilities $p_k(I)$ may be given as follows:

$$p_k(I) + \int_I f_{Y_k}(y_k) dy_k, k \geq 0.$$

The handoff probability from $BS_i$ and $BS_j$ may be expressed similarly in terms of the functions $q_k$ (the corresponding result for the probability of handoff $P_{ji}[k]$ from $BS_j$ to $BS_i$ being analogous):

$$P_{ij}[k] = \int_J q_k(y_k) dy_k, k \geq 1$$

The crossover point C, an important handoff performance measure is, may be defined as the point at which the probability of the mobile unit being assigned to $BS_i$ drops below a predetermined values such as 0.5. The crossover point may be a performance indicator of the cell size besides the handoff mechanism while the mobile unit is moving in the wireless environment. In other words, the crossover point may indicate how well the handoff strategy handles the mobility of users in order to keep the cell size as small as possible. Otherwise, large delays in hard handoff strategy typically decrease the outage probability. Therefore, the further the crossover point is from the ideal situation the more calls are dropped or more interference is induced into the network. The crossover point may be defined by:

$$C = d_s * \arg \min\{1 \leq k \leq M : P_i[k] \leq 0.5\}. \quad (17)$$

A second performance measure of importance is the mean number of handoffs that occur as the mobile moves along a given trajectory. The mean number of handoffs may be a good indicator for the amount of signaling to maintain the wireless connectivity while the mobile unit is moving Let $N_{ho}$ denote the number of handoffs that occur for a mobile moving along a given trajectory. Then for two base stations $BS_i$ and $BS_j$, the mean number of handoffs may be given by:

$$E[N_{ho}] = \sum_{K=1}^{M} ((P_{ij}[k]) + (P_{ji}[k])) = \sum_{K=1}^{M} P_h[k]. \quad (18)$$

Both the crossover point and the mean number of handoffs for LOS and NLOS routes have been evaluated numerically. The mobility characteristics are covered through a range of speeds from 2 m/s to 16 m/s. In this numerical investigation, the path loss was assumed to follow a two-slope model with $u_i=2$, $\beta_i=2$ and $g=150$ m for all base stations $BS_i$. The corner effect was assumed to take place 5 m into the corner, so that the mobile moving from $BS_0$ to $BS_1$ would experience the corner effect at $D_c=255$ m from $BS_0$. Correlated log-normal shadows were used having a standard deviation of $\sigma_s=6$ dB. The decay factor $d_0$ in (4), was set such that the autocorrelation function $R_{W_i}(\tau)$ has a value of $0.1\sigma_s^2$ at 30 m. We also selected the sampling time interval for handoff decision instants as $\tau_s=0.5$ s, approximately the same as in the GSM standard.

Figure 8:
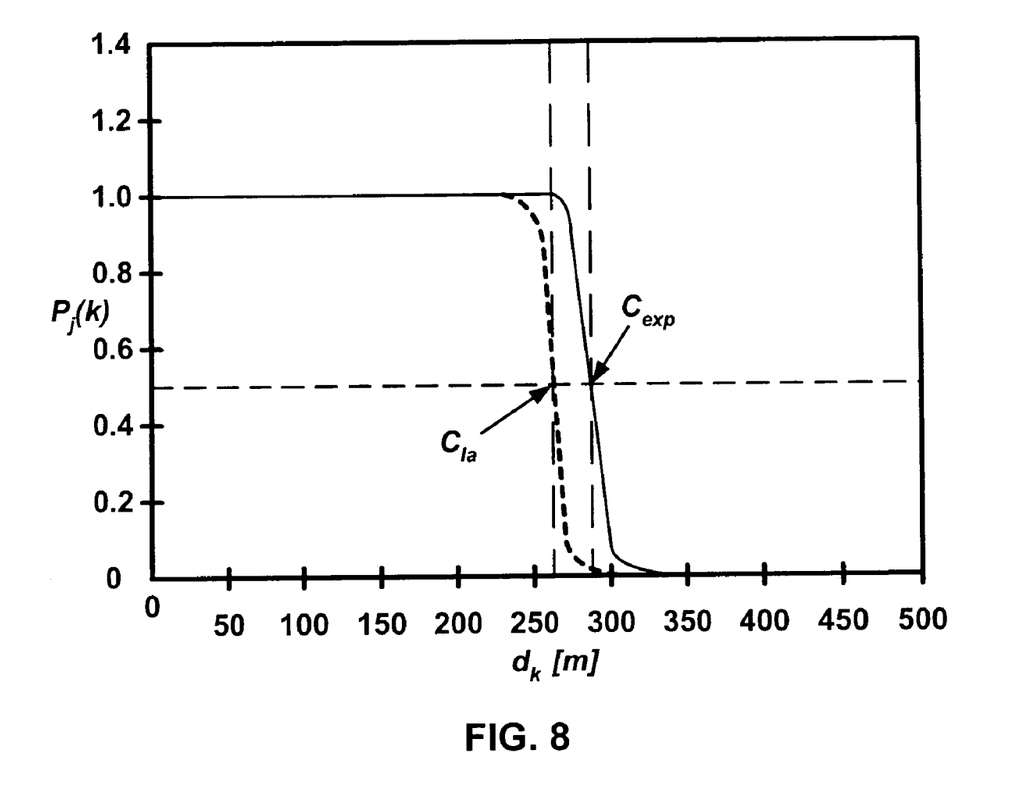
FIG. 8 shows assignment probabilities for NLOS for an embodiment of the present invention.

The recursive integration procedures presented in this disclosure allow for efficient computation of the sequences of assignment and handoff probabilities for a mobile unit moving along LOS and NLOS trajectories within a Manhattan type of cellular environment. For a speed of 8 m/sec, FIG. 8 shows two plots of assignment probability for a NLOS trajectory with exponential averaging (EA) and local averaging (LA). The continuous curve in FIGS. 8, 9, 10, and 11 correspond to a hysteresis level of h=3 using exponential averaging with $d_{av}$=10 as per the present invention. The dash lined curves in FIGS. 8, 9, 10, and 11 corresponding to a hysteresis level of h=16 using the local averaging technique as per the present invention. In this FIG. 8, $C_{exp}$ points out the crossover point of the curve. The crossover point with local averaging, $C_{la}$, lies about 20 m to the left of $C_{exp}$. The difference of 20 m, implies an improvement in the handoff delay of about 2.5 s.

Figure 9:
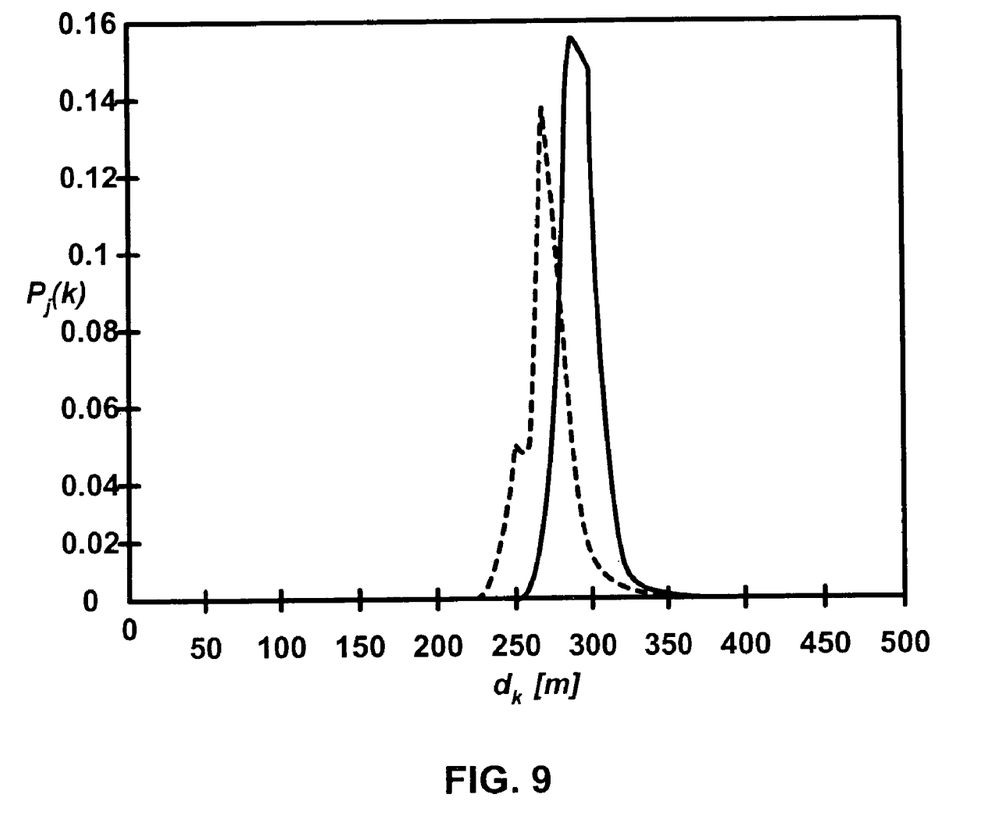
FIG. 9 shows handoff probabilities for NLOS for an embodiment of the present invention.
Figure 10:
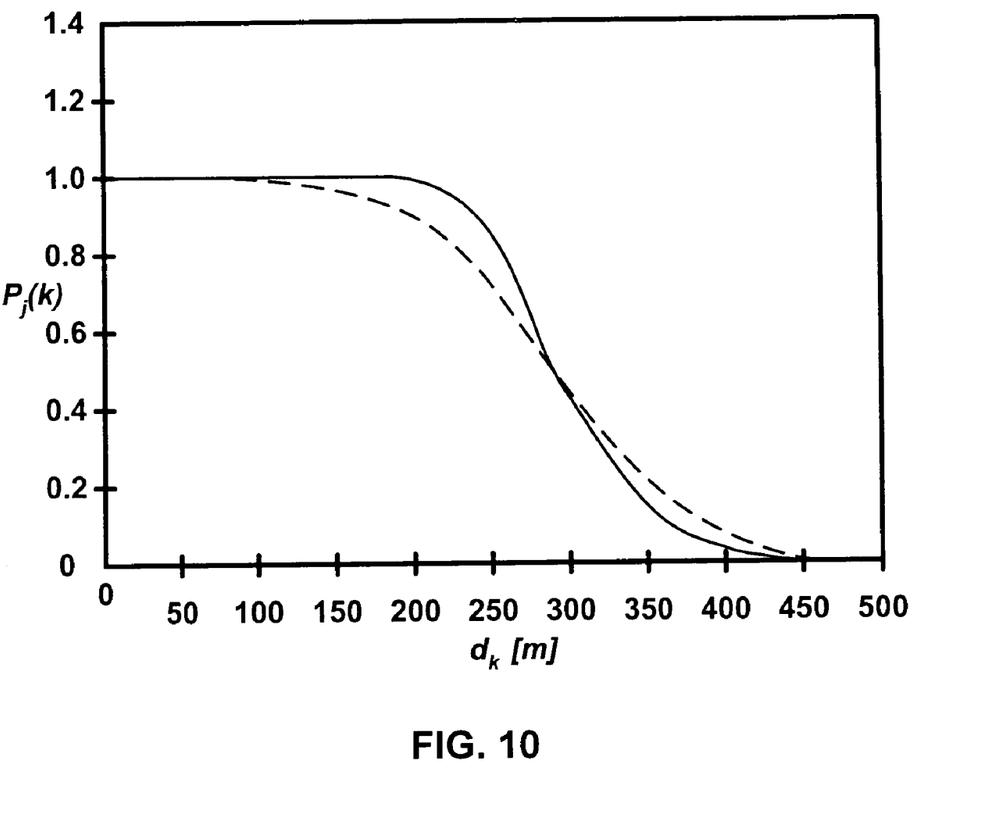
FIG. 10 shows assignment probabilities for LOS for an embodiment of the present invention.
Figure 11:
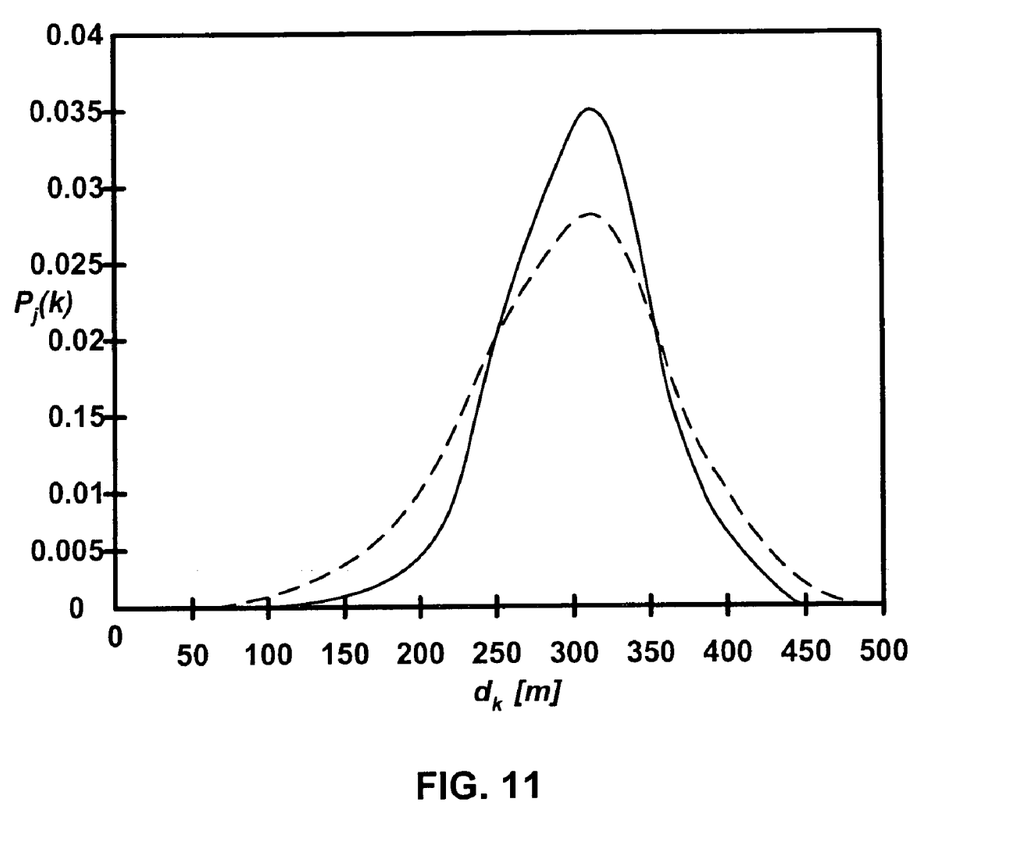
FIG. 11 shows handoff probabilities for NLOS for an embodiment of the present invention.

FIG. 9 shows the handoff probability curves given by (16) calculated for the two averaging techniques in the NLOS case. The areas under these handoff curves determine approximately the mean numbers of handoff. Since the two areas are about equal, the same amount of signaling is required for the handoff in achieving the crossover points $C_{exp}$ and $C_{la}$. Therefore, it appears that an overall gain of 2.5 s in handoff delay may be achieved for the NLOS path by using the local averaging method as per the present invention.

Also shown, is an analysis of the LOS case for the two averaging methods. The assignment and handoff probabilities in this case are plotted in FIGS. 10 and 11, respectively. In this case, the same handoff performance in terms of crossover point and mean number of handoffs for both averaging methods is shown. In other words, using the local averaging technique does not affect handoff performance in the LOS case. To summarize, a gain of 2.5 s in handoff delay may be achieved for the NLOS path, while the same handoff performance indicators may be maintained for the LOS path.

This patent presents a local averaging technique to enable fast handoffs in microcellular networks. Disclosed is an analytical model and an efficient numerical procedure to evaluate the performance of fast handoff algorithms with local averaging. Numerical results show that the local averaging technique improves handoff performance for both line-of-sight (LOS) and non-line-of-sight (NLOS) mobile trajectories. The performance gain using local averaging increases with the speed of the mobile.

Preferably, local averaging may greatly improve handoff performance in microcellular environments, by reducing the impact of corner effects. Aspects of the present invention may be used to dimension and optimize the class of fast handoff algorithms using local averaging.

When local averaging is used, a handoff of the mobile user from base station $BS_i$ to base station $BS_j$ when the relative processed signal strength falls below a hysteresis value $-h_j$. Conversely, a handoff from base station $BS_j$ to base station $BS_i$ occurs when the relative signal strength exceeds the hysteresis value of $h_i$. The performance of the handoff algorithm when local averaging is substituted for exponential averaging is significantly better in the presence of corner effects. However, to achieve the same mean number of handoffs along a given trajectory, a higher hysteresis value must be chosen when local averaging is applied. In practice, the dynamic range of the relative signal strength may be constrained such that smaller hysteresis values are required in order for the handoff mechanism to make correct handoff decisions.

To remedy this situation, one embodiment of the present inventions introduces a drop timer to be used in conjunction with local averaging. Using a drop timer, a drop time interval may be specified by a value D. Given that mobile unit is assigned to base station at time k−1, a handoff to $BS_j$ may occur at time k if and only if $\tilde{X}[l] \in J$ for l=k−D+1, ... k. In other words, a handoff to $BS_j$ may occur when the relative processed signal strength remains below the hysteresis threshold $-h_j$ for D consecutive time slots. Similarly, given that the mobile unit is assigned to $BS_j$ at time k−1, a handoff to $BS_i$ occurs at time k if and only if $\tilde{X}[l] \in I$ for k=k−D+1, ... ,k. s The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

What is claimed is:

1. A cellular network handoff decision mechanism including:
   a) a reference cellular network having:
      i) at least two base stations, each of said at least two base stations having:
         (1) a location described by a position vector; and
         (2) a pilot signal having a pilot signal strength;
      ii) at least one mobile unit capable of:
         (1) moving along a trajectory; and
         (2) determining a received signal strength from said pilot signal; and
   b) a handoff decision mechanism including:
      i) a sampling interval, selected using a carrier wavelength;
      ii) a local averaging interval, larger than said sampling interval;
      iii) a handoff decision interval, said handoff decision interval being larger than said local averaging interval;
      iv) a base station sampler capable of sampling said pilot signal strength from at least two of said at least two base stations once during every said sampling interval;
      v) a base station selector capable of selecting at least two of said at least two base stations using a selection criterion; said selection criterion considering sampled pilot signal strengths;
      vi) a local averager capable of calculating a local average signal strength value using said received signal strength from each of said selected base stations once during every said local averaging interval using a local averaging calculation;
      vii) a handoff signal classifier capable of determining an assignment region in which said local average signal strength value lies using a hysteresis range; and
      viii) a handoff calculator capable of calculating a handoff decision once during every said handoff decision interval using a handoff calculation.

2. A cellular network handoff decision mechanism according to claim 1, wherein said handoff decision mechanism is a hard handoff decision mechanism.

3. A cellular network handoff decision mechanism according to claim 1, wherein said handoff decision mechanism is a soft handoff decision mechanism.

4. A cellular network handoff decision mechanism according to claim 1, wherein said sampling interval, said local averaging interval, and said handoff decision interval are time intervals.

5. A cellular network handoff decision mechanism according to claim 1, wherein said sampling interval, said local averaging interval, and said handoff decision interval are distance intervals.

6. A cellular network handoff decision mechanism according to claim 1, wherein said selection criterion includes selecting the current base station.

7. A cellular network handoff decision mechanism according to claim 1, wherein said base station selector selects only two base stations.

8. A cellular network handoff decision mechanism according to claim 1, further including a handoff performance metric calculator.

9. A cellular network handoff decision mechanism according to claim 8, wherein said handoff performance metric calculator includes an assignment probability calculator.

10. A cellular network handoff decision mechanism according to claim 8, wherein said handoff performance metric calculator includes a handoff probability calculator.

11. A cellular network handoff decision mechanism according to claim 9, further includes a crossover point calculator.

12. A cellular network handoff decision mechanism according to claim 9, further includes a mean number of handoffs calculator.

13. A cellular network handoff decision mechanism according to claim 1, wherein said handoff decision mechanism further includes a drop timer interval.

14. A cellular network handoff decision mechanism according to claim 13, wherein said handoff calculation considers said drop timer interval.

15. A cellular network handoff decision mechanism according to claim 13, further including a handoff performance metric calculator.

16. A cellular network handoff decision mechanism according to claim 15, wherein said handoff performance metric calculator includes an assignment probability calculator.

17. A cellular network handoff decision mechanism according to claim 15, wherein said handoff performance metric calculator includes a handoff probability calculator.

18. A cellular network handoff decision mechanism according to claim 16, further includes a crossover point calculator.

19. A cellular network handoff decision mechanism according to claim 16, further includes a mean number of handoffs calculator.

20. A method for making a cellular network handoff decision comprising the steps of:
  a) determining a sampling interval using a carrier wavelength;
  b) determining a local averaging interval, said local averaging interval being larger than said sampling interval;
  c) determining a handoff decision interval, said handoff decision interval being larger than said local averaging interval;
  d) selecting at least two selected base stations from a multitude of base stations using a selection criterion, said multitude of base stations being part of a reference cellular network, each of said at least two selected base stations having:
     i) a location described by a position vector; and
     ii) a pilot signal having a pilot signal strength;
  e) determining a received signal strength from said pilot signal strength for each of said at least two selected base stations once during every said sampling interval;
  f) calculating a local average signal strength value using each of said received signal strengths once during every said local averaging interval;
  g) determining an assignment region in which said local average signal strength value lies using a hysteresis range; and
  h) calculating a handoff decision once during every said handoff decision interval using a handoff calculation.

21. A method according to claim 20, wherein said handoff decision is a hard handoff decision.

22. A method according to claim 20, wherein said handoff decision is a soft handoff decision.

23. A method according to claim 20, wherein said sampling interval, said local averaging interval, and said handoff decision interval are time intervals.

24. A method according to claim 20, wherein said sampling interval, said local averaging interval, and said handoff decision interval are distance intervals.

25. A method according to claim 20, wherein only two base stations are selected during said step of selecting at least two selected base stations.

26. A method according to claim 20, further including the step of calculating at least one handoff performance metric.

27. A method according to claim 26, wherein said step of calculating at least one handoff performance metric includes calculating an assignment probability.

28. A method according to claim 26, wherein said step of calculating at least one handoff performance metric includes calculating a handoff probability.

29. A method according to claim 20, further includes the step of calculating a crossover point.

30. A method according to claim 20, further includes the step of calculating a mean number of handoffs.

31. A method according to claim 20, wherein said handoff calculation considers a drop timer interval.

32. A method according to claim 31, further including the step of calculating at least one handoff performance metric.

33. A method according to claim 31, wherein said step of calculating at least one handoff performance metric includes calculating an assignment probability.

34. A method according to claim 31, wherein said step of calculating at least one handoff performance metric includes calculating a handoff probability.

35. A method according to claim 31, further includes the step of calculating a crossover point.

36. A method according to claim 31, further includes the step of calculating a mean number of handoffs.

* * * * *